US010075685B1

United States Patent
Fulghum et al.

(10) Patent No.: US 10,075,685 B1
(45) Date of Patent: Sep. 11, 2018

(54) VIRTUAL IMAGE DISTANCE TEST SUBSYSTEM FOR EYECUP ASSEMBLIES OF HEAD MOUNTED DISPLAYS

(71) Applicant: Oculus VR, LLC, Menlo Park, CA (US)

(72) Inventors: Matthew Robert Fulghum, Palo Alto, CA (US); Samuel Redmond D'Amico, Irvine, CA (US); Simon Hallam, San Jose, CA (US); Kieran Tobias Levin, Redwood City, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/186,512

(22) Filed: Jun. 19, 2016

(51) Int. Cl.
*H04N 17/04* (2006.01)
*H04N 9/31* (2006.01)
*G06T 19/00* (2011.01)
*G06T 7/00* (2017.01)

(52) U.S. Cl.
CPC ......... *H04N 9/3191* (2013.01); *G06T 7/0075* (2013.01); *G06T 19/006* (2013.01); *H04N 9/3182* (2013.01)

(58) Field of Classification Search
CPC ..................................................... H04N 17/04
USPC ......................................................... 348/189
See application file for complete search history.

(56) References Cited

U.S. PATENT DOCUMENTS

| | | | | |
|---|---|---|---|---|
| 2005/0219363 A1* | 10/2005 | Kohler | ................... | H04N 1/401 348/187 |
| 2008/0062164 A1* | 3/2008 | Bassi | ................... | H04N 9/3147 345/214 |
| 2010/0141802 A1* | 6/2010 | Knight | ............... | H04N 5/23212 348/240.3 |
| 2015/0065803 A1* | 3/2015 | Douglas | ............. | A61B 1/00009 600/200 |

* cited by examiner

*Primary Examiner* — Paulos M Natnael
*Assistant Examiner* — Sihar Karwan
(74) *Attorney, Agent, or Firm* — Fenwick & West LLP

(57) ABSTRACT

An optical evaluation workstation evaluates quality metrics (e.g., virtual image distance) of eyecup assemblies of a head mounted display (HMD). The workstation includes an eyecup assembly feed assembly configured to receive an eyecup assembly of a head mounted display (HMD), the eyecup assembly comprising an optics block rigidly fixed at a first distance to an electronic display panel. The optical evaluation workstation includes a camera assembly configured to capture a plurality of images of the electronic display panel through the optics block, the camera assembly comprising a pinhole aperture at an exit pupil position and a camera attached to a lens assembly having an adjustable focus. The optical evaluation workstation includes a control module configured to determine one or more virtual image distances of the eyecup assembly using the plurality of images captured by the camera assembly.

20 Claims, 5 Drawing Sheets

VIRTUAL IMAGE DISTANCE TEST SUBSYSTEM FOR EYECUP ASSEMBLIES OF HEAD MOUNTED DISPLAYS

BACKGROUND

The disclosure relates generally to testing optical components, and specifically to systems for performing optical quality assurance tests on eyecup assemblies of head-mounted displays (HMDs).

An HMD includes dual eyecup assemblies. Each eyecup assembly may include an electronic display and various optical elements. After assembly, a user places the HMD such that the user's eye is located at an exit pupil location of the HMD. Due to imperfect manufacturing tolerances, the optical quality of an image presented at the exit pupil may not be optimal. For example, the virtual image distance may not be optimal. The assessment of the virtual image distance of the image produced at the exit pupil is difficult, especially in if the assessment is to be performed quickly in an assembly line setting. Additionally, no standardized test system exists to assess the virtual image distance in the context of HMDs.

SUMMARY

An optical evaluation workstation is designed to simulate the environment of a HMD to test for various quality metrics of an eyecup assembly of the HMD. The optical evaluation workstation includes an eyecup assembly feeder, a camera assembly, and a control model. The eyecup assembly feeder is configured to receive an eyecup assembly of a head mounted display (HMD). The eyecup assembly includes an optics block (e.g., an assembly of various lenses) and an electronic display panel (e.g., an organic light emitting diode panel).

The camera assembly is configured to capture one or more images produced by the electronic display panel through the optics block of the eyecup assembly. The camera assembly is positioned at the exit pupil of the eyecup assembly to simulate the position of a user's eye when using the eyecup assembly in an HMD. Furthermore, the camera assembly includes a pinhole aperture at an exit pupil position of the eyecup assembly and a camera coupled to a lens assembly having an adjustable focus. The light produced by the electronic display panel passes through the pinhole aperture and the lens assembly to be collected by an imaging sensor of the camera. The pinhole aperture may be of a diameter approximating the diameter of a human pupil.

The control module configured to determine one or more virtual image distances of the eyecup assembly using the plurality of images captured by the camera assembly. The virtual image distance (VID) is a distance from the position of the exit pupil to a virtual image created by the combination of the electronic display panel and the optics block.

In one embodiment, to determine the VID of an eyecup assembly, the control module instructs the electronic display panel to display a test pattern. The test pattern may be a white image. The control module instructs the camera assembly to simultaneously adjust a focal distance of the lens assembly during a transition of the focus from a first distance to a second distance and capture the plurality of images during the transition. In other words, the control module instructs the camera assembly to adjust the focus of the lens assembly, and capture an image after each adjustment. This may be repeated from a minimum focus distance to a maximum focus distance. Using the captured images, the control module determines the one or more virtual image distances based on evaluating the plurality of captured images.

The control module may determine one or more focal distances that are associated with one or more images of the plurality of captured images that has a maximum sharpness. As used here, focal distance may correspond to the focal distance of the lens assembly or a value corresponding to the current position of a focusing ring of the lens assembly or some other focusing mechanism of the lens assembly. In other words, the control module determines those of the plurality of images that have a maximum sharpness, and determines the focal distance associated with these images. The focal distance for each image may be provided by the camera assembly.

In some cases, the control module separates each of the plurality of captured images based on color channel into one or more sets of images prior to determining the image with the maximum sharpness. Each set of images corresponds to one color channel of one or more color channels of the plurality of captured images. Thus, each set of images includes images having colors of a specific color channel. The control module determines for one or more color channels a respective level of sharpness for each of the plurality of images. The sharpness may be determined using a Sobel operator, by analyzing the gradient of the image generated by the Sobel operator. The control module ranks, for each of the one or more color channels, the images based on the determined level of sharpness. The control module selects at least one image having a highest level of sharpness for each of the one or more color channels based on the ranking. The control module determines for the one or more color channels a respective focal distance that is associated with the selected at least one image, and determines a virtual image distance for each of the one or more color channels based on the determined focal distances. By determining the sharpness for images of the individual color channels, the issue of chromatic aberration may be avoided.

As an example, the control module separate each of the captured images into a set of single color channel images, each single color channel image including one of the color channels (e.g., red, green, and blue) of the captured image. The control module determines the sharpness values of each of the single color channel images. The control module generates a sharpness curve for each color channel using the sharpness values determined for the single color channel images for each color channel, and identifies a maximum point on each sharpness curve for each color channel. The control module determines the focal distance associated with the maximum point for each color channel.

The control module may then determine the VID associated with each of these focal distances using a table that stores entries associating focal distances with VIDs. This table may have been generated during a prior calibration phase. The control module may then generate a report based on this VID information to present to a user. The report may also indicate whether the VID is within an acceptable range. In some cases, the report may be used to pair up eyecup assemblies with similar VID values.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
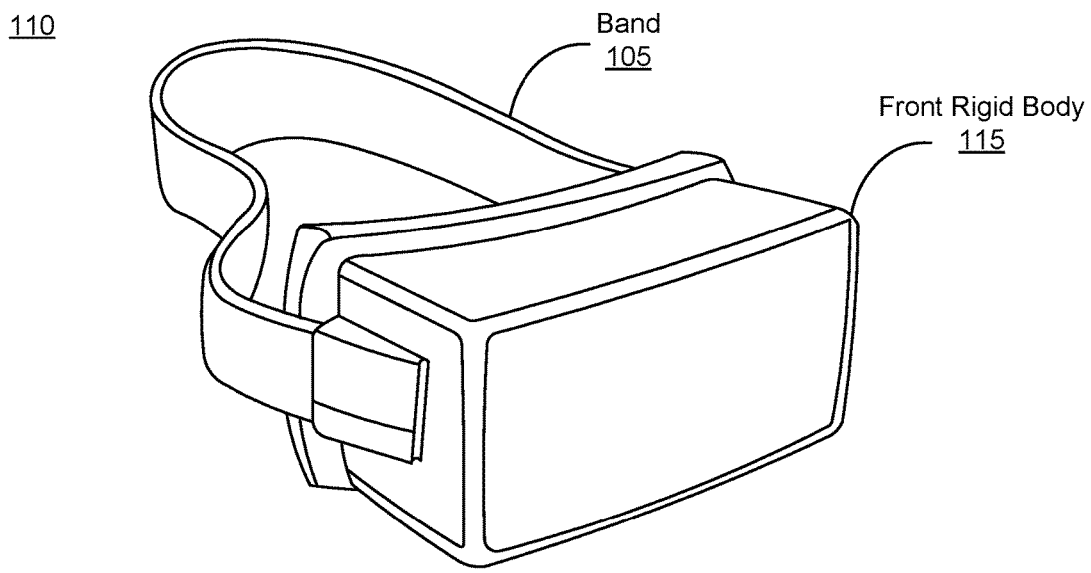
FIG. 1A is a diagram of a HMD, in accordance with an embodiment.

FIG. 1A is a diagram of an HMD 110, in accordance with an embodiment. The HMD 100 is a head-mounted display that presents media to a user. Examples of media presented by the HMD include one or more images, video, audio, or some combination thereof. The media presented to the user may have an interactive element. In some embodiments, audio is presented via an external device (e.g., speakers and/or headphones) that receives audio data based on the audio information. The HMD 100 is generally configured to operate as a VR HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., images, video, sound, etc.).

The HMD 110 shown in FIG. 1A includes a band 105 and a front rigid body 115. The band 105 is configured for users to wear the HMD on their head. The front rigid body 115 includes one or more optical elements which together display media to users. As discussed below in conjunction with FIG. 1B, the front rigid body 115 includes at least one eyecup assembly for directing image lights to user's eye(s).

Different components of a HMD 110 contribute to quality metrics of the elements inside the HMD. For example, optical elements, display elements, the tolerances of structural elements affixing the optical and display elements, and other components of the HMD may affect the quality metrics of the HMD. A quality metric is a characteristic which indicates how well an element of the HMD meets certain performance requirements. For example, one quality metric is the virtual image distance of the image produced by the HMD. The virtual image distance is the distance at from the exit pupil of the HMD where a virtual image is produced. The quality metric of the virtual image distance is further discussed below with reference to FIGS. 2-5.

Figure 1B:
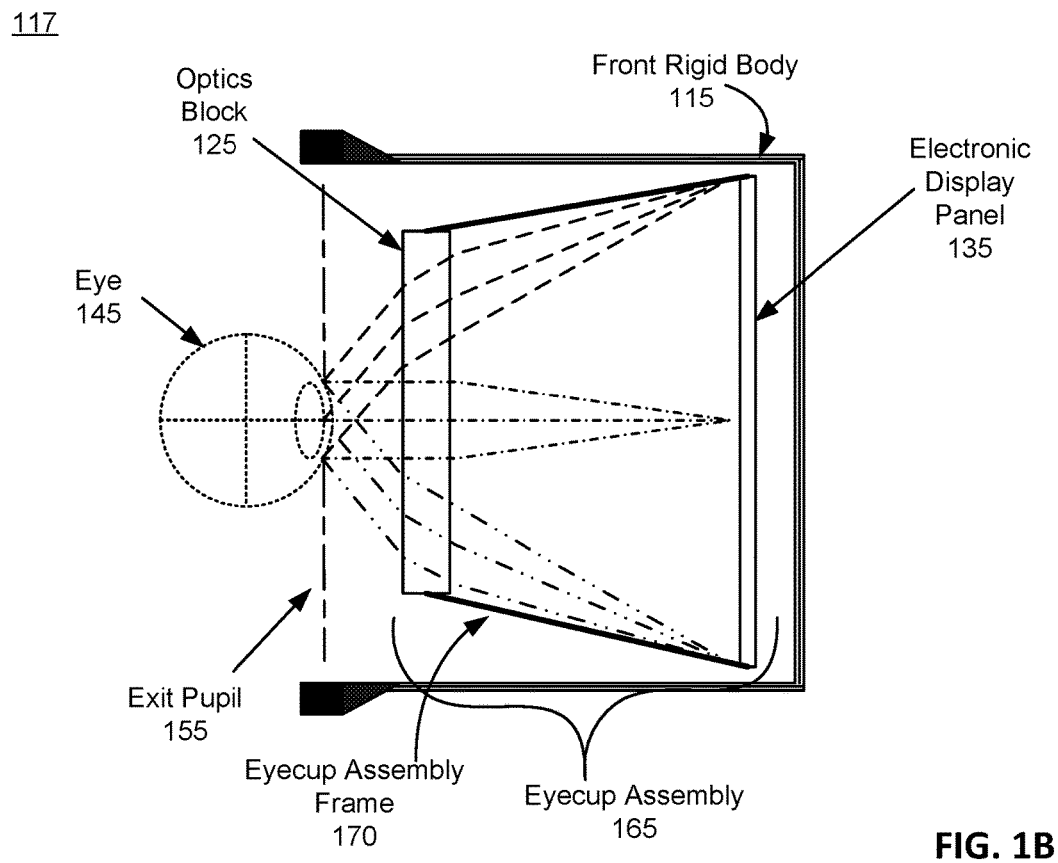
FIG. 1B is a cross section of the front rigid body and eyecup assembly of the HMD shown in FIG. 1A, in accordance with an embodiment.

FIG. 1B is a cross section 117 of the front rigid body 115 of the HMD 110 shown in FIG. 1A, in accordance with an embodiment. The cross section 117 of the front rigid body 115 includes an eyecup assembly 165. For purposes of illustration, FIG. 1B shows a cross section 117 associated with a single eye 145, but another eyecup assembly, separate from the eyecup assembly 165, provides altered image light to another eye of the user.

The eyecup assembly 165 includes an optics block 125, an eyecup assembly frame 170, and an electronic display panel 135 which together provide image light to an exit pupil 155.

The exit pupil 155 is the location where a user's eye 145 is positioned when the user wears the HMD 110.

The electronic display panel 135 is positioned at a first distance from the exit pupil 155 which is the distance between the eye of a user and the image displayed on the display panel 135. The display panel 135 displays images to the user in accordance with data received from the HMD 110, or from another external source. In various embodiments, the electronic display panel 135 may comprise a single electronic display element or multiple electronic display elements (e.g., a display for each eye of a user). Examples of the electronic display panel 135 include: a liquid crystal display (LCD), an organic light emitting diode (OLED) display, an active-matrix organic light-emitting diode display (AMOLED), some other display, or some combination thereof.

The optics block 125 is positioned at a second distance from the electronic display panel 135 within the eyecup assembly 165. The optics bock 125 magnifies received image light from the electronic display panel 135 and corrects for some optical errors associated with the image light and the corrected image light is presented to a user of the HMD 110. In various embodiments, the optics block 125 includes one or more optical elements—also referred to as viewing optical elements. Example optical elements included in the optics block 125 include: an aperture, a Fresnel lens, a convex lens, a concave lens, a filter, or any other suitable optical element that affects image light. Moreover, the optics block 125 may include combinations of different optical elements. In some embodiments, one or more of the optical elements in the optics block 125 may have one or more coatings, such as anti-reflective coatings.

The optics block 125 may be designed to correct one or more types of optical errors. Examples of optical errors include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error.

The eyecup assembly frame 170 directs light from the electronic display panel 135 to the optics block 125. The eyecup assembly frame 170 fixes the optics block 125 and electronic display panel 135 relative to each other. The eyecup assembly frame 170 may be composed of, e.g., foam, metal, plastic, some other suitable material that is opaque to visible light, or some combination thereof.

The electronic display panel 135 and the optical elements inside the optics block 125 may both affect the quality metrics. In particular, the virtual image distance produced by the eyecup assembly 165 may be affected by the distance between the electronic display panel 135 and the optics block 125 and the position of the optics block 125 relative to the electronic display panel 135. Due to the potential for the quality of the image produced by the eyecup assembly 165 to be affected negatively, an optical evaluation workstation, such as the one described herein, is developed to test for these quality metrics to ensure that the image produced by each eyecup assembly meets quality metric requirements.

Figure 2:
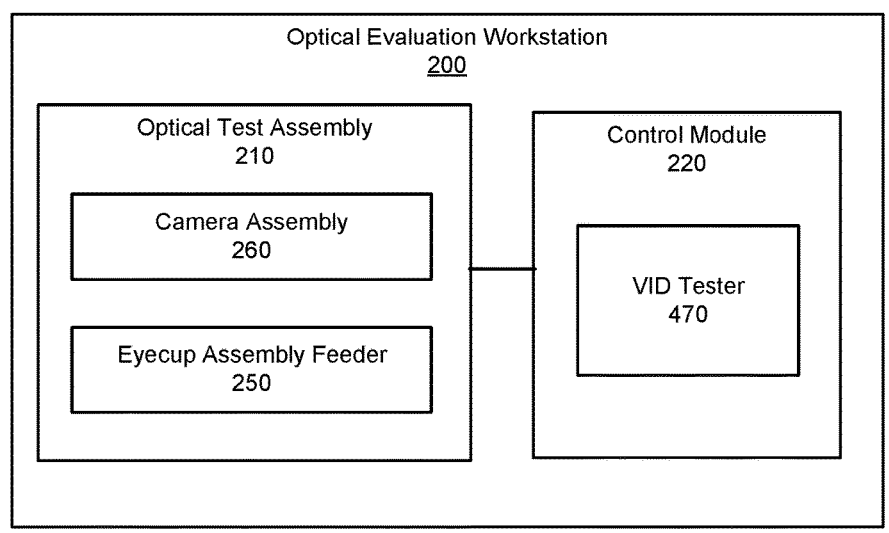
FIG. 2 is a system block diagram of an optical evaluation workstation, in accordance with an embodiment.

FIG. 2 is a system block diagram of an optical evaluation workstation 200, in accordance with an embodiment. Some embodiments of the optical evaluation workstation 200 have different components than those described here. Similarly, the functions can be distributed among the components in a different manner than is described here. The optical evaluation workstation 200 evaluates one or more quality metrics of an eyecup assembly 165 in an environment designed to replicate the environment inside the HMD 110. As described above, a quality metric is a characteristic which indicates how well an element or elements in the eyecup assembly 165 meets certain performance requirements. Example quality metrics may include spatial resolution, optical contrast, distortion, astigmatism, etc. In particular, the optical evaluation workstation 200 of FIG. 2 may be used to evaluate a quality metric indicating the virtual image distance of the image produced by the eyecup assembly 165.

The optical evaluation workstation 200 includes an optical test assembly 210 and a control module 220. The optical test assembly 210 tests quality metrics of the eyecup assembly 165 (e.g., the optics block 125, the electronic display panel 135) inside the HMD 110. In one embodiment, the optical test assembly 210 tests for a virtual image distance of the image produced by the eyecup assembly 165 of the HMD 110. The optical test assembly 210 includes an eyecup assembly feeder 250 and a camera assembly 260.

The eyecup assembly feeder 250 includes one or more attachment elements that receive and removably attach or hold on to the eyecup assembly 165. In some embodiments, there may be multiple attachment elements that attach to different parts (sub-elements) of the eyecup assembly 165, such as the optics block 125, the eyecup assembly frame 170, or the electronic display panel 135. After the eyecup assembly feeder 250 receives the eyecup assembly 165, the eyecup assembly feeder 250 (or a user) places the eyecup assembly 165 in a test position. A test position is a specific position of the eyecup assembly 165 used to evaluate the eyecup assembly 165 for quality metrics.

The eyecup assembly 165 under test may be placed by the eyecup assembly feeder 250 in a testing position with the camera assembly 260 above the eyecup assembly 165 or to the side of the eyecup assembly 165, respectively. Furthermore, the eyecup assembly 165 may be placed by the eyecup assembly feeder 250 at a position such that an exit pupil of the eyecup assembly 165 aligns with the front of the lens assembly for the camera assembly 260. Once the eyecup assembly feeder 250 places the eyecup assembly 165 in the testing position, it may also couple with the eyecup assembly 165 to provide communications and/or power to the eyecup assembly 165. The coupling may include a data connection for the electronic display panel 135, a power connection for the electronic display panel 135, and so on.

The camera assembly 260 captures images or videos (e.g., of test patterns) produced by an eyecup assembly 165 under test. In particular, the camera assembly 260 captures images produced by the electronic display panel 135 that have passed through the optics block 125. The camera assembly 260 is positioned at the exit pupil of a corresponding eyecup assembly 165 in order to simulate the location of where a user's eye would be located while wearing the HMD 110.

In one embodiment, the camera assembly 260 is also positioned via structural elements (e.g., using countersunk bolts) in the optical evaluation workstation 200 such that it may be translated along an x-y plane that is orthogonal to an axis that passes through the optics block 125 and the electronic display panel 135 of the eyecup assembly 165. This allows the camera assembly 260 to be moved to make minor adjustments to its position, and reduces potential damage to the camera assembly 260 due to an accidental impact. This also fixes the camera assembly 260 such that it remains a certain distance from the eyecup assembly. In some embodiments, the camera 260 may be adjustable in other directions. For example, the camera may be placed on a six-axis stage (i.e., adjustable in x, y, z, pitch, yaw, and roll). Additional details regarding the camera assembly 260 are described with reference to FIG. 3.

The control module 220 provides instructions to the optical evaluation workstation 200 to execute quality tests to measure various quality metrics of the eyecup assembly 165. In some embodiments, the control module 220 receives a quality test request from a user and then instructs the optical evaluation workstation 200 to receive an eyecup assembly 165 to be tested. The control module can also instruct the camera assembly 260 to capture any images or video produced by the eyecup assembly 165.

In one embodiment, the control module 220 generates a mapping from pixels of the electronic display panel 135 to the pixels of an image sensor of the camera assembly 260, prior to performing any quality tests. This generation of the mapping may be accomplished by instructing the electronic display panel 135 to display various images including sequences of pixels, and instructing the camera assembly 260 to capture these images. By generating the mapping, the control module 220 is able to determine a precise alignment of the electronic display panel 135 relative to the image sensor of the camera assembly 260 and the eyecup assembly 165. The mapping may later be used by the control module 220 to determine an exact position of any defects on the electronic display panel 135, as well as instruct the electronic display panel 135 to display images that have been corrected for various optical errors, such as those described above.

The control module 220 includes a virtual image distance (VID) tester 270 for performing a quality test to measure a quality metric indicating a virtual image distance of images produced by the eyecup assembly 165 that is being tested is undergoing testing.

As noted, the virtual image distance is the distance at from the exit pupil to a plane where a virtual image is produced (i.e., in focus). The virtual image corresponds to an image produced by the electronic display panel 135. For example, when source of image light, such as an image produced by the electronic display panel 135, is placed at a point along a perpendicular axis to a lens that has a distance to the lens that is shorter than the focal distance of the lens, then a person at the other side of the lens perceives a virtual image. Due to the way in which light is perceived, this virtual image appears to be a magnified version of the source image, but also appears to be further away than the actual distance from the source of the image to the lens, although no actual image light is produced at that virtual distance. The virtual image is produced at a point at which the rays of the image light were to converge if these rays were projected backwards.

Regarding the eyecup assembly 165 and referring to the above example, the VID of the eyecup assembly 165 is the distance from the exit pupil 155 of the virtual image produced via the electronic display panel 135 (the source image light) and the optics block 125 (the lens). Typically, the VID is set to approximately 2-5 meters to ensure a comfortable distance for a user viewing the image in the HMD, although the electronic display panel 135 is much closer to ensure a compact HMD device. The VID is based upon the distance between the optics block 125 and the electronic display panel 130 and the focal distance and configuration of the optics block 125.

In one embodiment, the VID tester 270 instructs the electronic display panel 135 to display a VID test pattern. The VID test pattern allows the VID tester 270 to determine the VID of the eyecup assembly 165 being tested. In one embodiment, the VID test pattern includes an image of a single color. The single color may be white, such that all wavelengths of the visible spectrum are produced by the electronic display panel 135. Furthermore, the VID tester 270 may instruct the electronic display panel 135 to display the VID test pattern at a maximum saturation (i.e., brightness). This may increase the signal to noise ratio when the image is captured. In one embodiment, multiple VID test patterns are used, and each test pattern may include an image of a primary color (e.g., red, green, and blue).

The VID tester 270 subsequently instructs the camera assembly 260 to capture multiple images of the VID test pattern while also instructing the camera assembly 260 to adjust focus (of a lens assembly of the camera) from a first level to a second level in increments. These increments may be the minimum change of focal distance that the lens assembly is capable of making. In one embodiment, the first level of focus is the minimum focal distance available to the camera assembly 260, and the second level of focus is the maximum focal distance available to the camera assembly 260. While VID tester 270 instructs the camera assembly 260 to adjust the level of the focus, the VID tester 270 also instructs the camera assembly 260 to capture images. The VID tester 270 receives from the camera assembly 260 both a captured image and the level of the focus at which the captured image was taken. The images may be captured linearly with regard to the change in focus. The result is that the VID tester 270 has multiple images that are captured by the camera assembly 260 at multiple levels of focus. In one embodiment, the level of focus that is received by the VID tester 270 from the camera assembly 260 indicates the position of a focusing ring or focusing motor of the camera assembly 260 between a first position corresponding to the first focal distance, and a second position corresponding to the second focal distance. In one embodiment, the VID tester 270 instructs the camera assembly 260 to only capture a central portion (e.g., a square with a 1 mm diagonal distance) of the VID test pattern.

The VID tester 270 evaluates the sharpness of the color channels of the captured images in order to determine the focal distance corresponding to the maximum sharpness for each color channel. If one image was captured for each focus adjustment, the VID tester 270 divides these single images into multiple images, each image including the pixel intensity values of a single color channel. For example, if the captured images are of uniform white backgrounds, the VID tester 270 may filter each of these images into their respective color channels (e.g., red, green, and blue). Note that the image received from the camera assembly 260 may be in a raw image format of the camera assembly 260 that allows the VID tester 270 to directly determine the sensor data for each subpixel of the imaging sensor of the camera without any or any significant post-processing applied (e.g., if the camera assembly 260 uses a Bayer color filter array, then each pixel is composed of a red, blue, and two green subpixels). If the VID tester 270 receives a raw image format from the camera, the VID tester 270 can separate the raw image into the respective color channels using the subpixel information within the raw image format.

In one embodiment, the VID tester 270 separates each captured image into three separate images, each image having only red, green, or blue color channel data. The VID tester 270 then determines the level of focus at which maximum sharpness is achieved for each color channel. For each set of images taken over the range of focal distances for one color channel, the VID tester 270 determines the maximum sharpness by evaluating the sharpness for each image captured over the different levels of focus until it finds the image for that color channel that has the highest sharpness. To determine sharpness for each image, the VID tester 270 may use a Sobel operator (also known as a Sobel-Feldman operator) on the image, which computes an approximation of the gradient of the image intensity (using convolution), and with a result that emphasizes the edges in images. Using the Sobel operator, the VID tester 270 may derive a sharpness score based on the magnitude of the gradients within the image. For example, a large gradient (i.e., change) over a particular distance in the image may indicate a sharp transition, i.e., a high sharpness, and the score may be based on a weighted average of these gradients.

An exemplary illustration of focal distance versus sharpness for red, green, and blue wavelengths is described below with reference to FIG. 4.

In one embodiment, the imaging resolution of the camera assembly 260 may be high enough such that the captured images of the camera assembly 260 may be able to distinguish the fine details of the boundaries between individual pixel elements of the electronic display panel 135. When determining the sharpness of the captured image, the VID tester 270 may determine the sharpness of the boundaries between the pixel elements and other visible elements at this fine detail level. Thus, although the image appears to be uniformly lit when viewed from afar, with sufficient resolution the details of the image are revealed and the sharpness of the image may be determined.

In one embodiment, the captured images provide focal distances are too coarse to determine a point of maximum sharpness. In other words, the discrete nature of the data collection and the sample size does not ensure that the captured image with the maximum sharpness is the actual focal distance with the maximum sharpness in the image. In such a case, the VID tester 270 further fits a parabola to a plot of the focal distance and determined sharpness levels for each color, and the focal distance at the sharpness maximum for each parabola is determined by the VID tester 270 to be the focal distance with maximum sharpness for that color.

In one embodiment, the VID tester 270 determines a range of focal distances at which a maximum sharpness is achieved. This may help to reduce errors if only a single focal distance is provided.

In one embodiment, the VID tester 270 may also compare the captured data with data from other optical evaluation workstations to ensure that no systemic error exists in the optical evaluation workstation 200. For example, the same eyecup assembly may be tested in multiple optical evaluation workstations to ensure that each workstation is outputting the same values. If an error exists, the VID tester 270 may indicate an error condition to a user. The error may indicate an error in the alignment of the eyecup assembly 165 and the camera assembly 260, a calibration error, or something else.

After determining for each color the focal distance that results in the maximum sharpness, the VID tester 270 determines the virtual image distance (VID) or a range of VIDs of the virtual image produced by the eyecup assembly 165. In one embodiment, to determine the VID, the VID tester 270 accesses a table that stores associations between VIDs and focal distances.

The table may have been created a priori. For example, the camera assembly 260 may have been placed in front of an optics block that is known to be good at the same distance as during the testing process described here, and the distance between the optics block and an electronic display panel that is also known to be good is varied. After each change in this distance, the focal distance is adjusted for each color and a focal distance at which maximum sharpness is reached is determined. The VID may then be determined based on knowledge of the focal length or lens power (diopter) of the optics block (which may be determined experimentally) and the distance between the electronic display panel and the optics block, using, for example, the Gaussian form of the common lens equation. A different equation may also be used in order to account for the thickness of the optics block, and so on. The VID may also be determined in other ways, such as experimentally. The determined VID and the associated focal distance are stored as an entry in the table.

In one embodiment, instead of looking up the VID in a table, the VID tester 270 may compute the VID dynamically (i.e., on-the-fly). Using knowledge of the focal distance of the camera assembly 260 at the particular focal distance of maximum sharpness, the VID tester 270 may be able to calculate dynamically the VID using knowledge of the focal distance as well as the diopter of the optics block 125. The VID tester 270 may use the VID value as the quality metric indicating the virtual image distance of images produced by the eyecup assembly. The dynamic computation may be useful if the diopter of the optics block 125 varies between eyecup assemblies.

In one embodiment, the VID tester 270 generates a report based on the determination of the quality metric indicating the VID of the eyecup assembly 165 being tested. The report indicates the VID or VID range of the eyecup assembly, and may also indicate whether this result is within a threshold range.

The report may then be provided by the VID tester 270 to a user, to a log, or other component. In one embodiment, if the eyecup assembly 165 has a score that falls outside the threshold range, the affected eyecup assembly 165 may be removed from the assembly process and the VID tester 270 may instruct the eyecup assembly feeder 250 to place the affected eyecup assembly 165 in a separate holding area.

In one embodiment, the VID tester 270 marks eyecup assemblies that have similar VID (or VID ranges) for pairing such that these eyecup assemblies may be both placed in the same HMD during subsequent assembly.

After the quality tests are completed, the control module 220 can instruct the eyecup assembly feeder 250 to remove or replace the eyecup assembly 165 currently being tested with another eyecup assembly.

Figure 3:
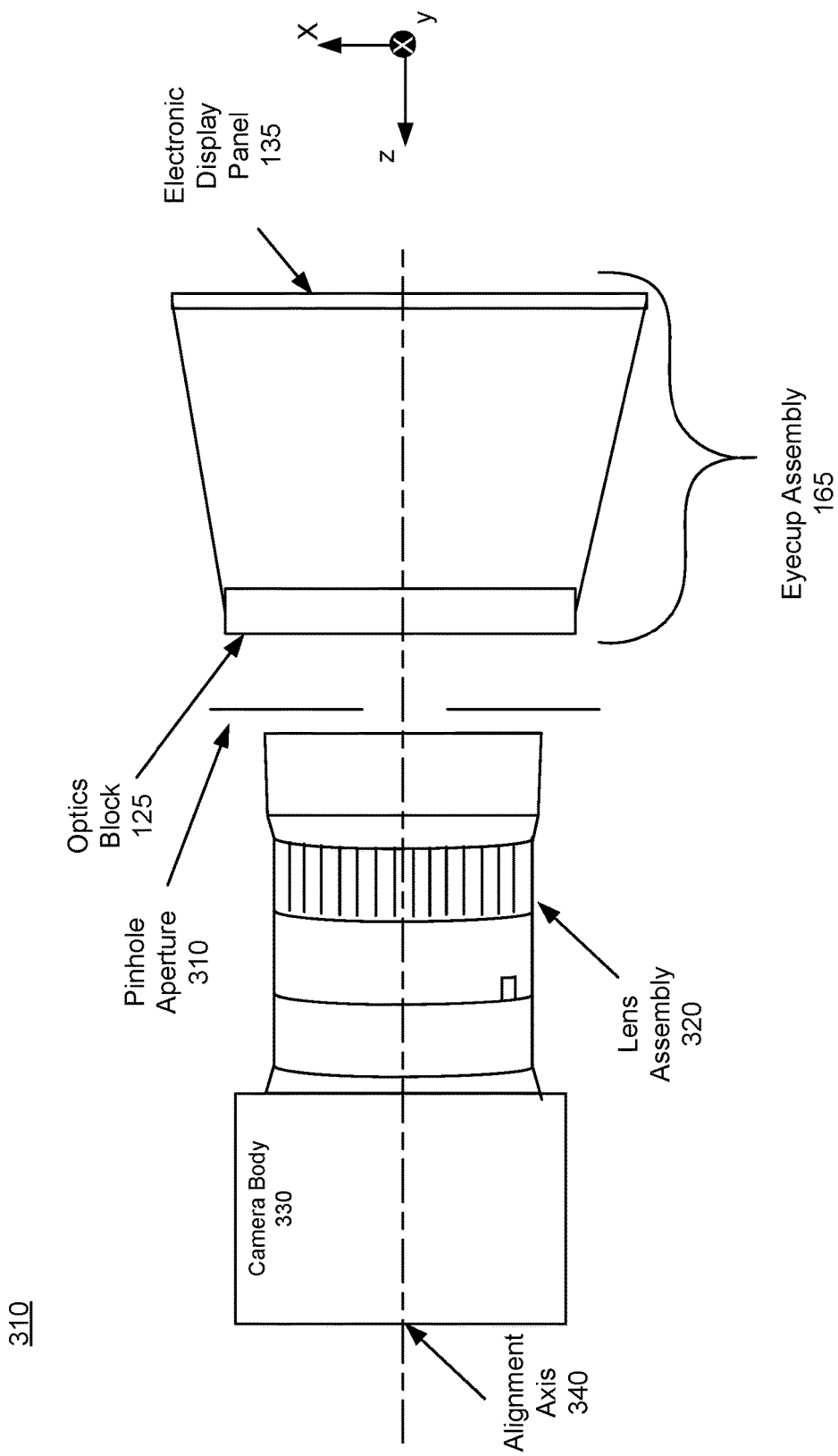
FIG. 3 illustrates components of an exemplary eyecup test assembly for eyecup assemblies, in accordance with an embodiment.

FIG. 3 illustrates components of an exemplary eyecup test assembly 310 for eyecup assemblies according to an embodiment. Some embodiments of the eyecup test assembly 310 have different components than those described here. Similarly, the functions can be distributed among the components in a different manner than is described here. In some embodiments, the eyecup test assembly 310 is an embodiment of the optical test assembly 210 shown in FIG. 2. The optical test assembly 310 includes a camera body 330, a lens assembly 320, a pinhole aperture 310. The optical test assembly 310 evaluates an eyecup assembly 165 under test.

The camera body 330 of the eyecup test assembly 310 is part of the camera assembly 260. The camera body 330 includes an image sensor to capture images as well as other control circuitry and components typical of a camera. In one embodiment, the camera body 330 is a digital single-lens reflex camera, however, in other embodiments, the camera body 330 may be another type of imaging device, such as a digital video recorder, a mirrorless camera, etc. In some embodiments, the camera body 330 may be configured to be able to be coupled to different lens assemblies. In some embodiments, the camera body 330 may be fixed to a lens assembly that cannot be removed.

The lens assembly 320 is coupled the camera assembly 260. The lens assembly 320 gathers light from an aperture opposite the side of the lens assembly 320 that is attached to the camera body 330, and directs this light to the image sensor of the camera body 330. In one embodiment, the lens assembly 320 is a telephoto lens with a macro lens attachment. In some embodiments, the lens assembly 320 is placed at an exit pupil location of the eyecup assembly 165 such that it is at a position in front of the eyecup assembly 165 corresponding to a position of a human eye relative to the eyecup assembly 165 when a user wears the HMD 110 that includes the eyecup assembly 165. In other embodiments, the lens assembly 320 may be placed at other locations relative to the eyecup assembly 165. In one embodiment, the F-stop of the lens assembly 320 is set such that objects outside the focal plane of the lens assembly 320 do not appear in focus when images of light from those objects are captured through the lens assembly 320. Additionally, the focus adjustment of the lens assembly 320, which may be actuated via a motor, may be directly controllable by the control module 260. Note that the lens assembly may have a large aperture and long focal length to minimize its depth off field, which may assist in adequately resolving the sharpness peaks of the color channels of the electronic display panel.

The pinhole aperture 310 is an aperture of a small diameter (e.g., 10 mm) removably attached to the lens assembly. The small diameter may approximate the diameter of aperture of the pupil of a human eye. This allows the camera assembly 260 to better approximate the human eye when testing the eyecup assembly 165, as well as allow the image to be captured in increased sharpness (e.g., with less depth of field blurring effects).

The camera assembly including the camera body 330, lens assembly 320, and pinhole aperture 310 are carefully aligned with the eyecup assembly 165 such that the central axis of the camera assembly is aligned with the central axis of the eyecup assembly by the eyecup assembly feeder 250. An improper alignment may cause an error in the computed VID for the eyecup assembly 165.

The lens assembly 320 and pinhole aperture 310 may be positioned along an alignment axis 340 to minimize light entering the lens assembly 320 that was not generated by the eyecup assembly 165. This may be achieved by a structural feature of the eyecup assembly itself (e.g., a molding that circumscribes the aperture of the lens assembly 320) or via an external structural element that blocks external light sources from transmitting light to the system.

Figure 4:
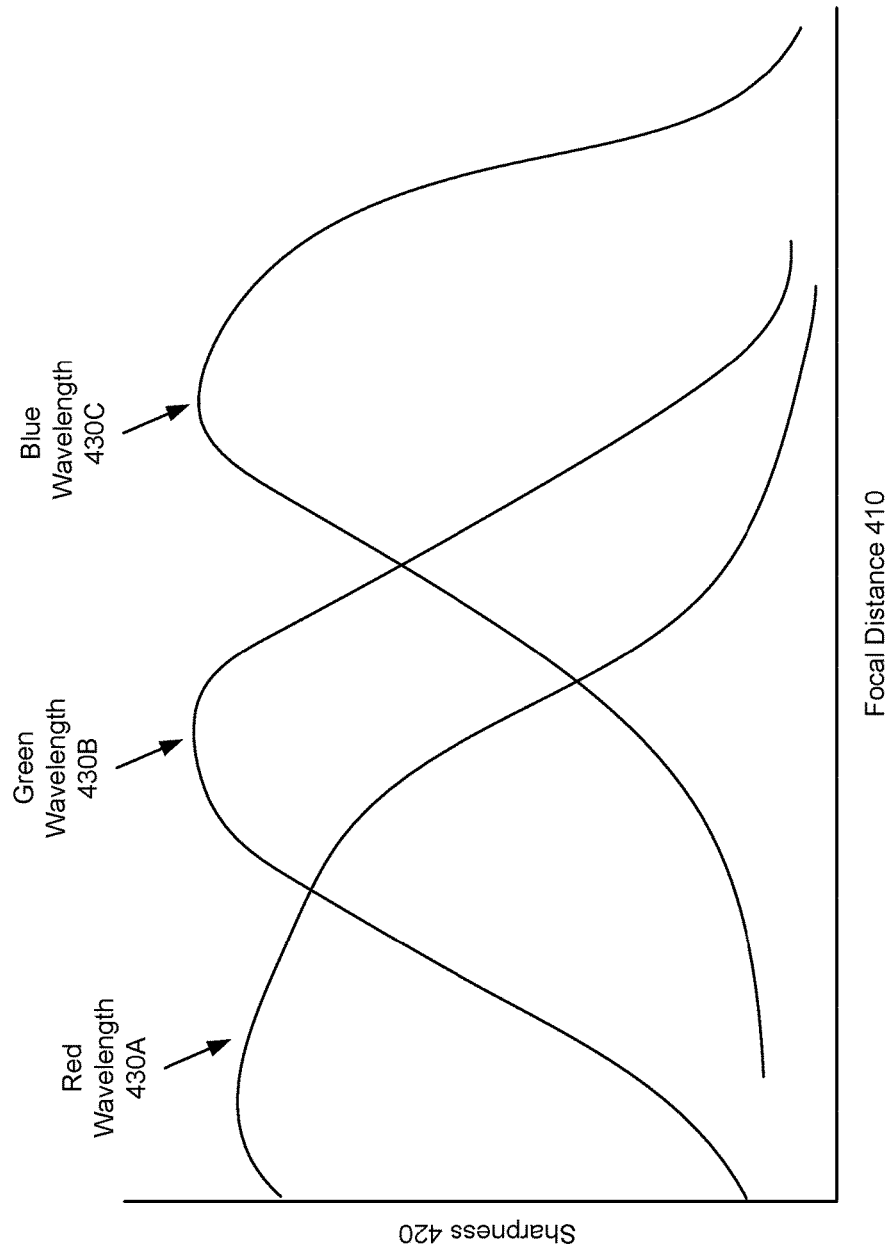
FIG. 4 illustrates an example of a sharpness to focal distance plot of red, blue, and green wavelengths, in accordance with an embodiment.

FIG. 4 illustrates an example of a sharpness to focal distance plot of red, blue, and green wavelengths, in accordance with an embodiment. The focal distance may correspond directly to the focal distance of the lens assembly, or a value corresponding to the current position of a focusing ring or other focusing mechanism of the lens assembly 320. This position may be changed using a motor (e.g., a stepper motor) as described above, and may correspond linearly with the focal distance. As shown in FIG. 4 the point of maximum sharpness varies for each of the colors tested. Additionally, the sharpness 420 for each color tapers off in both directions from the focal distance 410 that offers maximum sharpness. In particular, the red wavelength 430A achieves max sharpness at a smaller focal distance 410 than the green wavelength 430B, which achieves max sharpness at a smaller focal distance 410 than the blue wavelength 430C. The reason each wavelength (i.e., color) achieves maximum sharpness at a different focal distance 410 is due to longitudinal chromatic aberration, i.e., the eyecup assembly 165 under test does not bring every wavelength of color to the exact same focal plane. Thus, the maximum focus for each color is slightly different, so that the VID tester 270 analyzes the maximum focus of each color separately, as described above.

Example Flows

Figure 5:
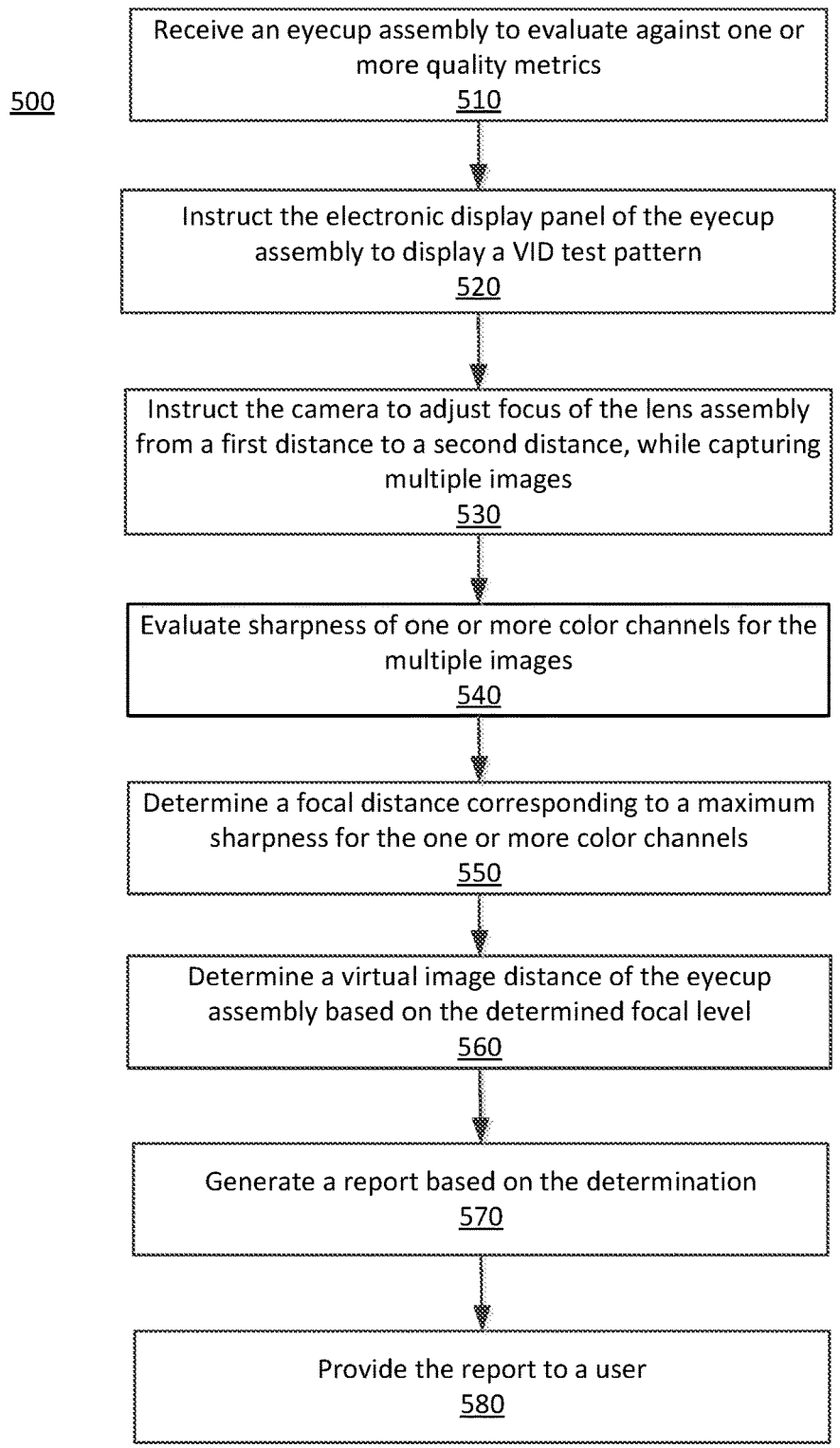
FIG. 5 is a flow chart illustrating a process for determining the virtual image distance for an eyecup assembly of an HMD, in accordance with an embodiment.

FIG. 5 is a flow chart illustrating a process 500 for determining the virtual image distance for an eyecup assembly (e.g., an eyecup assembly 165) of an HMD (e.g., HMD 110), in accordance with one embodiment. The process of FIG. 5 may be performed by the optical evaluation workstation 200. Other entities may perform some or all of the steps of the process in other embodiments. Likewise, embodiments may include different and/or additional steps, or perform the steps in different orders.

The optical evaluation workstation 200 receives 510 an eyecup assembly to be tested and evaluated against one or more quality metrics. For example, the optical evaluation workstation 200 can receive from a user an eyecup assembly in a structural element of the optical evaluation workstation 200. The optical evaluation workstation 200 places the received eyecup assembly in a testing position. The testing position simulates the position of the eyecup assembly in an HMD as described above. As another example, the optical evaluation workstation 200 automatically retrieves a new eyecup assembly and places it in the structural element of the optical evaluation workstation 200 for testing.

The optical evaluation workstation 200 instructs 520 an electronic display panel (e.g., electronic display panel 135) of the eyecup assembly being tested to display a VID test pattern. For example, the VID test pattern may be an image with a white background. In one embodiment, prior to instructing the electronic display panel to display the VID, the optical evaluation workstation 200 determines a mapping between the pixels of the imaging sensor of the camera of the optical evaluation workstation 200 and the pixels of the electronic display panel.

The optical evaluation workstation 200 instructs 530 the camera to adjust focus of the lens assembly of the camera from a first level to a second level, while capturing multiple images during the adjustments. The camera may be instructed to capture the images at a uniform interval (between focal distances), continuously, or at shorter intervals near the middle of the focus range and at longer intervals elsewhere. For example, the optical evaluation workstation 200 instructs the lens assembly to transition from a minimum focal distance to a maximum focal distance while instructing the camera to simultaneously capture images continuously during the transition. The images are captured such that the test pattern is imaged through an optics block of the eyecup assembly.

The optical evaluation workstation 200 evaluates 540 the sharpness of each color channel of the multiple captured images. In one embodiment, the optical evaluation workstation 200 determines the sharpness of each color channel of each image using a Sobel operator.

The optical evaluation workstation 200 determines 550 a focal distance for each color channel that corresponds to a maximum sharpness (or sharpness range). In one embodiment, this is a level of focus of the lens assembly that produced a captured image that has the maximum focus. In some embodiments, the optical evaluation workstation 200 fits a curve to the focal distance and sharpness data for each captured image of a color channel and determines a maximum value of the curve where sharpness is highest. The maximum sharpness may be expressed as a single value or as a range of values (to account for errors), and thus the focal distance may be expressed as a single value or a range of values.

The optical evaluation workstation 200 determines 560 a virtual image distance (VID) of the eyecup assembly based on the determined focal distance that produces the maximum sharpness. The optical evaluation workstation 200 may determine the VID from the focal distance using a pre-computed table that was generated experimentally, or may determine the VID on the fly based on knowledge of the diopter of the optics block in the eyecup assembly and using the physical properties of optics. In one embodiment, if the VID is determined to fall outside a threshold range, the optical evaluation workstation 200 determines that the eyecup assembly does not meet the quality metric for VID.

The optical evaluation workstation 200 generates 570 a test report based on the determination of the VID. The test report may, e.g., indicate the eyecup assembly does/does not meet the quality metric. The optical evaluation workstation 200 presents 580 the test report to a user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical evaluation workstation comprising:
    an eyecup assembly feeder configured to receive an eyecup assembly of a head mounted display (HMD), the eyecup assembly comprising an optics block and an electronic display panel, and the electronic display panel presenting one or more test patterns;
    a camera assembly configured to capture one or more images of the one or more test patterns presented by the electronic display panel through the optics block, the camera assembly comprising a pinhole aperture at an exit pupil of the eyecup assembly and a camera; and
    a control module configured to determine one or more virtual image distances (VIDs) of the eyecup assembly using the plurality of images captured by the camera assembly, wherein a virtual image distance is a distance from a position of the exit pupil to a virtual image of the electronic display panel, as viewed through the optics block, wherein a virtual image is an image produced in a plane where rays of light appear to, but do not actually, converge behind the electronic display panel, and wherein the determined VID is used to automatically pair up eyecup assemblies with similar VID values.

2. The optical evaluation workstation of claim 1, wherein the camera includes a lens assembly having an adjustable focus, and the control module is further configured to:
    instruct the electronic display panel to display a test pattern;
    instruct the camera assembly transition a focus distance of the lens assembly from a first distance to a second distance, wherein the transition includes a range of focal distances between the first distance and the second distance;
    instruct the camera assembly to capture a plurality of images during the transition, the plurality of images captured at different focal distances; and
    determine the one or more virtual image distances based on evaluating the plurality of captured images.

3. The optical evaluation workstation of claim 2, wherein the test pattern is a uniform white image.

4. The optical evaluation workstation of claim 2, wherein the first distance is a minimum focus distance for the lens assembly and the second distance is a maximum focus distance for the lens assembly.

5. The optical evaluation workstation of claim 2, wherein the control module is further configured to:
    determine for one or more color channels a respective level of sharpness for each of the plurality of images;
    rank, for each of the one or more color channels, the plurality of images based on the determined level of sharpness;
    select at least one image having a highest level of sharpness for each of the one or more color channels based on the ranking;
    determine for the one or more color channels a respective focal distance that is associated with the selected at least one image; and
    determine a virtual image distance for each of the one or more color channels based on the determined focal distances.

6. The optical evaluation workstation of claim 5, wherein the control module is further configured to:
    separate each of the plurality of captured images into a set of single color channel images, each single color channel image including one of the color channels of the captured image;
    determine a plurality of sharpness values of each of the single color channel images;
    generate a sharpness curve for each color channel using the sharpness values determined for the single color channel images for each color channel;
    identify a maximum point on each sharpness curve for each color channel; and
    determine the focal distance associated with the maximum point for each color channel.

7. The optical evaluation workstation of claim 6, wherein the control module is further configured to:
    determine the sharpness value for each image based on the gradient values produced by a Sobel operator applied to each single color channel image.

8. The optical evaluation workstation of claim 5, wherein the control module is further configured to:
    determine a virtual image distance for a focus distance by accessing a stored table, each entry of the stored table associating a focus distance of the lens assembly with a virtual image distance of the eyecup assembly.

9. The optical evaluation workstation of claim 1, wherein the control module is further configured to:
    generate a report for the determined virtual image distance, the report indicating whether the determined virtual image distance is within a threshold range of acceptable virtual image distances.

10. A method comprising:
    receiving an eyecup assembly of a head mounted display (HMD), the eyecup assembly comprising an optics block rigidly fixed at a first distance to an electronic display panel;
    instructing an electronic display panel of the eyecup assembly to display a virtual image distance test pattern;
    instructing a camera assembly having a pinhole aperture to capture one or more images of the virtual image distance test pattern displayed by the electronic display panel; and
    determining one or more virtual image distances (VIDs) of the eyecup assembly based on the captured one or more images, wherein a virtual image distance is a distance from a position of the exit pupil of the eyecup assembly to a virtual image of the electronic display panel, as viewed through the optics block, wherein a virtual image is an image produced in a plane where rays of light appear to, but do not actually, converge behind the electronic display panel, and wherein the determined VID is used to automatically pair up eyecup assemblies with similar VID values.

11. The method of claim 10, further comprising:
instructing the camera to adjust a focal distance of the lens assembly during a transition of the focus from a first distance to a second distance and capture the plurality of images during the transition.

12. The method of claim 11, wherein the first distance is a minimum focal distance for the lens assembly and the second distance is a maximum focal distance for the lens assembly.

13. The method of claim 10, wherein the determining one or more virtual image distances of the eyecup assembly based on the captured images further comprises:
determining for one or more color channels a respective level of sharpness for each of the plurality of images;
ranking, for each of the one or more color channels, the plurality of images based on the determined level of sharpness;
selecting at least one image having a highest level of sharpness for each of the one or more color channels based on the ranking;
determining for the one or more color channels a respective focal distance that is associated with the selected at least one image; and
determining a virtual image distance for each of the one or more color channels based on the determined focal distances.

14. The method of claim 13, further comprising:
separating each of the plurality of captured images into a set of single color channel images, each single color channel image including one of the color channels of the captured image;
determining a plurality of sharpness values of each of the single color channel images;
generating a sharpness curve for each color channel using the sharpness values determined for the single color channel images for each color channel;
identifying a maximum point on each sharpness curve for each color channel; and
determining the focal distance associated with the maximum point for each color channel.

15. The method of claim 13, further comprising:
determining the sharpness value for each image based on the gradient values produced by a Sobel operator applied to each image.

16. The method of claim 13, further comprising:
determining a virtual image distance for a focal distance by accessing a stored table, each entry of the stored table associating a focal distance of the lens assembly with a virtual image distance of the eyecup assembly.

17. The method of claim 10, further comprising:
generating a report for the determined virtual image distance, the report indicating whether the determined virtual image distance is within a threshold range of acceptable virtual image distances.

18. An optical evaluation workstation comprising:
an eyecup assembly feeder configured to receive an eyecup assembly of a head mounted display (HMD), the eyecup assembly comprising an optics block and an electronic display panel, and the electronic display panel is presenting one or more test patterns;
a camera assembly configured to capture a one or more images of the one or more test patterns presented by the electronic display panel through the optics block, the camera assembly comprising a pinhole aperture at an exit pupil of the eyecup assembly and a camera; and
a control module configured to:
determine one or more virtual image distances (VIDs) of the eyecup assembly using the plurality of images captured by the camera assembly, wherein a virtual image distance is a distance from a position of the exit pupil to a virtual image of the electronic display panel, as viewed through the optics block, wherein a virtual image is an image produced in a plane where rays of light appear to, but do not actually, converge behind the electronic display panel, and wherein the determined VID is used to automatically pair up eyecup assemblies with similar VID values.

19. The optical evaluation workstation of claim 18, wherein the camera includes a lens assembly having an adjustable focus, and the control module is further configured to:
instruct the electronic display panel to display a test pattern;
instruct the camera assembly transition a focus distance of the lens assembly from a first distance to a second distance, wherein the transition includes a range of focal distances between the first distance and the second distance;
instruct the camera assembly to capture a plurality of images during the transition, the plurality of images captured at different focal distances; and
determine the one or more virtual image distances based on evaluating the plurality of captured images.

20. The optical evaluation workstation of claim 19, wherein the control module is further configured to:
determine for one or more color channels a respective level of sharpness for each of the plurality of images;
rank, for each of the one or more color channels, the plurality of images based on the determined level of sharpness;
select at least one image having a highest level of sharpness for each of the one or more color channels based on the ranking;
determine for the one or more color channels a respective focal distance that is associated with the selected at least one image; and
determine a virtual image distance for each of the one or more color channels based on the determined focal distances.

* * * * *

UNITED STATES PATENT AND TRADEMARK OFFICE
CERTIFICATE OF CORRECTION

PATENT NO. : 10,075,685 B1  
APPLICATION NO. : 15/186512  
DATED : September 11, 2018  
INVENTOR(S) : Matthew Robert Fulghum et al.

Page 1 of 1

It is certified that error appears in the above-identified patent and that said Letters Patent is hereby corrected as shown below:

In the Claims

Column no: 13, Line(s): 50, Claim 2: "instruct the camera assembly transition" to read as — instruct the camera assembly to transition —

Column no: 16, Line(s): 30, Claim 19: "instruct the camera assembly transition" to read as — instruct the camera assembly to transition —

Signed and Sealed this  
Twenty-ninth Day of October, 2019

Andrei Iancu  
*Director of the United States Patent and Trademark Office*